April 17, 1956  E. P. FRANZEN  2,742,511
METHOD FOR THE ADDITION OF CATALYST
Filed June 5, 1950  2 Sheets-Sheet 2

Inventor: Earl P. Franzen
By His Attorney:

United States Patent Office 2,742,511
Patented Apr. 17, 1956

2,742,511

METHOD FOR THE ADDITION OF CATALYST

Earl P. Franzen, Houston, Tex., assignor to Shell Development Company, San Francisco, Calif., a corporation of Delaware Application June 5, 1950, Serial No. 166,249

7 Claims. (Cl. 260—663)

This invention relates to a method and apparatus for supplying catalyst to liquid reaction mixtures, the invention being of particular value in connection with those processes wherein fresh quantities of catalyst must be added to the mixtures from time to time as the reaction continues.

There are many systems wherein addition of catalyst to a liquid reactant body presents serious problems. For example, some catalysts are corrosive and even abrasive in nature, and when it becomes necessary to supply the same to a reaction chamber through one or more conduit members, it is difficult to effect the addition without causing serious maintenance problems as regards the conduits and the associated pumps, valves and the like through which the catalyst passes. Again, other catalysts lose much of their activity on being exposed to the atmosphere or to other vapors or liquids before being introduced into the reaction mixture itself, and such catalysts must be protected against degradation in activity during the period prior to their addition to the mixture. The process wherein ethyl chloride is formed from ethylene and hydrogen chloride at elevated temperatures and pressures in the presence of ferric chloride catalyst has presented a particularly difficult problem from the standpoint of catalyst addition. The reaction is effected in the liquid phase by bubbling a vaporous, hydrogen chloride-ethylene mixture into a liquid, ethyl chloride-catalyst slurry present in the reactor. As the reaction continues, slurry is continuously withdrawn from the reactor and fed to a vaporizer where the ethyl chloride and other volatile components of the liquid are separated from the spent catalyst. In accordance with the method of operation heretofore employed, fresh catalyst is periodically added to the reactor in the form of a slurry of ferric chloride in liquid ethyl chloride, the catalyst being handled in this fashion to prevent loss in activity due to contact with moisture or ethylene. With each such addition of catalyst, the reaction rate reaches a maximum from which it gradually falls off as evidenced by both a rise in the pressure within the reactor as well as by a diminution in the amount of ethyl chloride formed, whereupon a further quantity of the catalyst slurry is again added to the reaction mixture.

In the foregoing method of operation, great difficulty has been experienced in transmitting the catalyst slurry to the reactor. Thus, it was first attempted to pump the slurry into the reactor vessel whenever the pressure within the latter rose to a predetermined level; however, the abrasive nature of the ferric chloride particles soon rendered the pumps inoperable and resort was necessarily had to a system whereby the slurry was injected into the reactor under pressure of hydrogen chloride, the amount of each such addition being manually controlled through a conventional valve assembly. Even with this system of operation, maintenance costs remain abnormally high for the valves develop leaks and there is frequent plugging of the lines with the catalyst slurry. A still more serious objection to the method is that despite the most careful control of the addition of fresh quantities of catalyst on the part of experienced operators, the system experiences wide variations in activity as evidenced by relatively large pressure variations in the reaction chamber and by an uneven discharge of ethyl chloride from the reactor, this discharge being so regulated as to maintain a constant liquid level in the reaction chamber. This fluctuation in activity stems in part from the irregularities inherent in any manually-controlled operation, though of greater importance is the fact that the concentration of the catalyst in the slurry is subject to considerable variation, as is the activity of succeeding increments of fresh catalyst. Wide changes in the activity of the system are undesirable since they impair the reactor output and cause an uneven rate of discharge of the liquid ethyl chloride product. This, in turn, causes serious difficulties in the vaporizer unit where the ethyl chloride is separated from the spent catalyst, for at unduly high activity levels large amounts of ethyl chloride are withdrawn from the reactor and the vaporizer has a tendency to become flooded, whereas at low activity little ethyl chloride is formed and the liquid level in the vaporizer falls so low as to create circulation pump suction difficulties.

It is an object of the present invention to provide a novel method and apparatus for supplying carefully regulated and predetermined amounts of catalyst of uniform activity to a liquid reaction mixture in such a manner that the catalyst is protected against degradation in activity up to the time of its introduction into the liquid mixture. Another object is to provide a system of catalyst addition which is free of the maintenance difficulties which have heretofore been encountered in such systems. A more particular object is to provide a method and apparatus for supplying ferric chloride in a reaction chamber maintained under elevated conditions of temperature and pressure and wherein additional quantities of ethyl chloride are continuously produced by reaction between incoming ethylene and hydrogen chloride, said method and apparatus being free of the difficulties heretofore encountered in the addition of catalyst and permitting of the addition of carefully regulated amounts of ferric chloride of uniform activity, whereby the reaction rate and the operating conditions prevailing in said reaction chamber may be controlled within narrow limits. The nature of still other objects of the invention will be apparent from a consideration of the descriptive portion to follow.

It is my discovery that the foregoing objects are attained by adding the catalyst to the liquid reaction mixture in the form of a package wherein the catalyst is enclosed within a plastic or other wrapper which protects the catalyst against deterioration in activity up to the time of its immersion in the liquid reaction mixture. The wrapper of the catalyst package is made up of a material which, while impervious to the various substances which are capable of exerting a deleterious action on the catalyst, is nevertheless readily soluble or otherwise dispersible in the liquid reaction mixture, with the result that the catalyst in the package is released to the reaction mixture within a short period after the package has been introduced therein.

In the case of the ethyl chloride system discussed above, the ferric chloride catalyst is hermetically sealed in a plastic container which is impervious to moisture, yet readily soluble in liquid ethyl chloride. While a variety of plastic compositions meet these requirements, a preferred packaging material is a copolymer of styrene and isobutylene. Particularly good results have been achieved using the S-Polymer (grades S-50 and S-60) manufactured by the Standard Oil Company of New Jersey and marketed by Enjay Company, Inc., these materials being copolymers of styrene and isobutylene combined by the low temperature technique similar to that used for making butyl. These copolymers are described in an article appearing in the November 1947 issue of The Rubber Age, pages 187–190.

Catalyst packages of the type described above can be prepared in any desired size and shape, and by the use of any of the techniques now practiced in the packaging art. Thus, packages may be prepared which contain precisely uniform amounts of catalyst, and since the packaged material is protected by its wrapper against contact with moisture and the various other substances which would otherwise impair the activity of the catalyst, the activity of catalytic material released to the liquid reaction mixture by succeeding packages is maintained at an even level.

The process of the present invention can be carried out simply by dropping the catalyst packages into the liquid reaction mixture whenever it appears that fresh quantities of catalyst should be added. However, in the case of systems such as the liquid ethyl chloride manufacturing operation described above wherein elevated conditions of pressure are maintained in the reaction chamber, it is necessary to provide means for adding the catalyst packages without unduly disturbing the physical conditions prevailing in the system. The apparatus of the present invention achieves this end in a particularly desirable manner, with the result that said apparatus is well adapted for use in those systems wherein the reactant liquid is maintained under elevated pressure. The nature of this apparatus will be apparent by reference to the drawings, wherein:

Figure 1:
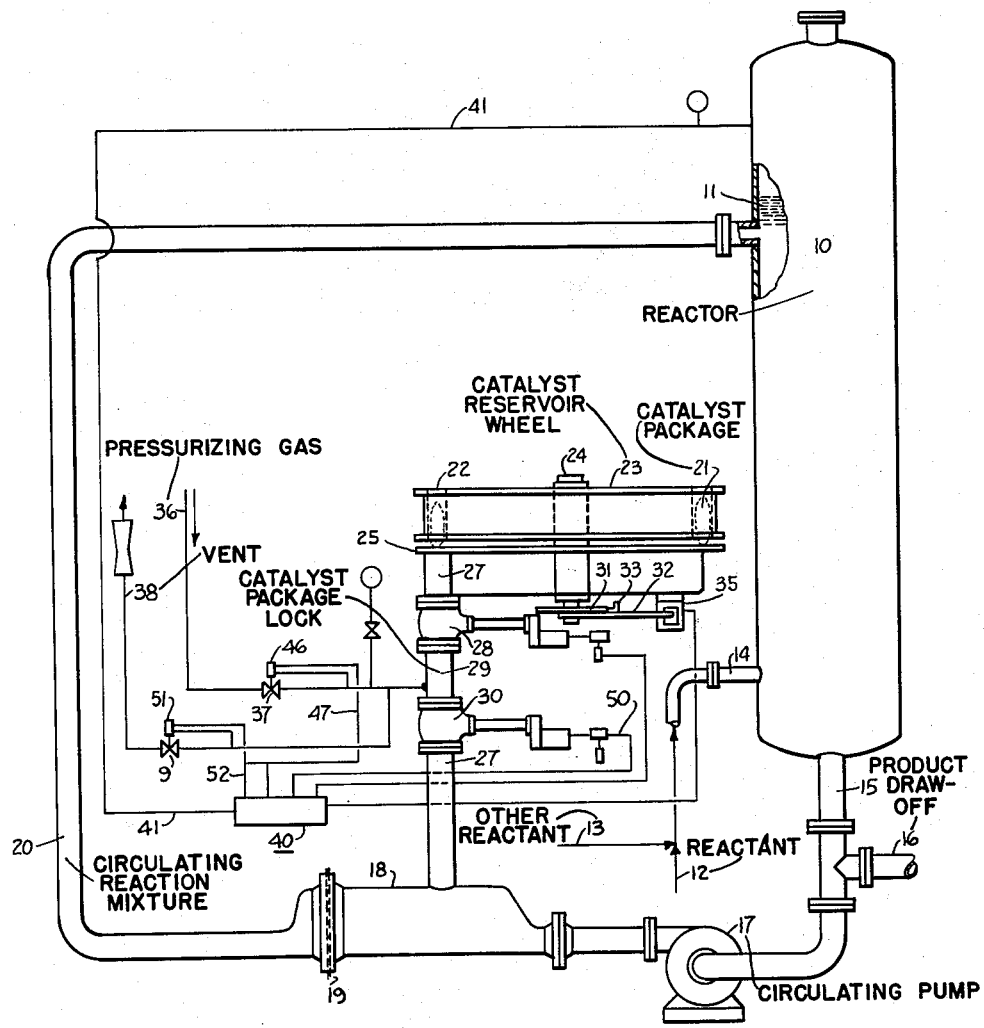
Fig. 1 is a side elevation of the reaction chamber and its associated apparatus for circulating the liquid reaction mixture and for supplying the catalyst packages to that mixture, the control apparatus and portions of the feed lines being shown somewhat diagrammatically.

Referring more in detail to the drawings, there is shown at 10 a reactor vessel adapted to contain a liquid reaction mixture 11 under elevated (i. e., superatmospheric) pressure. The reactants are supplied to the apparatus under pressure through the supply lines 12 and 13, and they enter the vessel 10 through a common feed line 14. The liquid 11 is continuously withdrawn at the bottom of reactor 10 through the line 15 where a portion thereof is diverted through line 16 for eventual product recovery, while the remainder is circulated by pump 17 through the enlarged chamber 18, screen 19 and line 20, back into the reactor 10.

Figure 2:
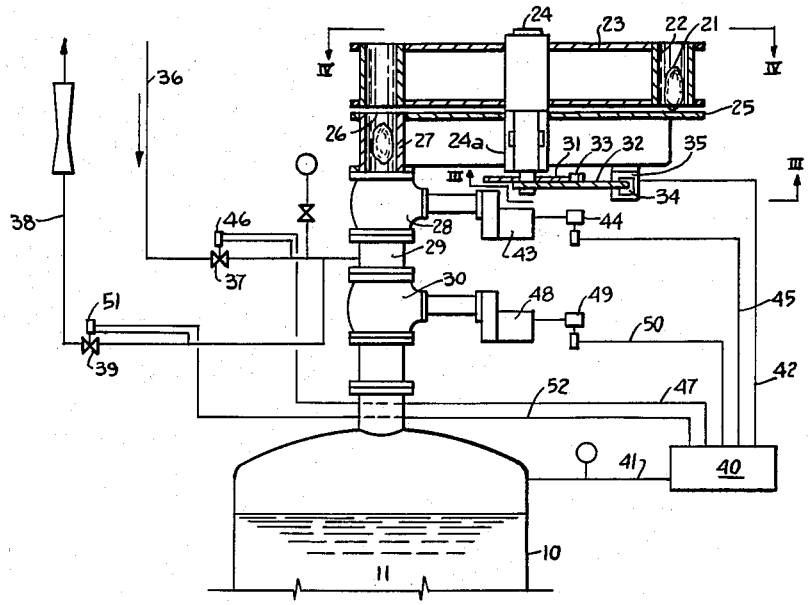
Fig. 2 is a fragmentary side elevation of the reactor and of a modified form of an apparatus for supplying the catalyst packages to the reaction chamber, with the control apparatus again being shown diagrammatically.
Figure 3:
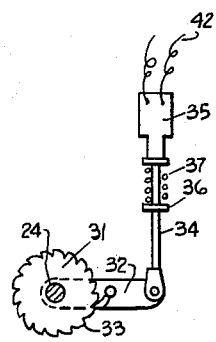
Fig. 3 is a sectional view taken along the line III—III of Fig. 2.
Figure 4:
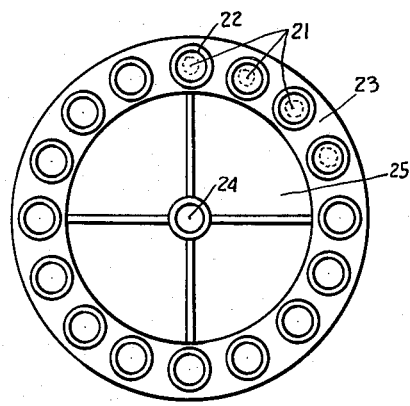
Fig. 4 is a plan view of the catalyst package reservoir shown in elevation in Fig. 3.

The catalyst packages 21 to be supplied seriatim to the liquid reaction mixture 11 are contained in the pockets 22 of a reservoir wheel 23 which is rotatably carried by the shaft 24 mounted within the bearing member 24a. The packages carried within these pockets rest upon a fixed plate member 25 provided with an opening 26, this opening being aligned with a conduit 27 which leads into the chamber 18 in the case of the apparatus of Fig. 1, or directly into the vessel 10 in the modified form of apparatus shown in Fig. 2. The conduit 27 includes a pair of serially arranged gate valves 28 and 30 which are spaced from one another by the conduit portion indicated at 29, the latter acting as a lock. In the operation of the device, whenever it is desired to add another catalyst package to the liquid reaction mixture, the wheel 23 is advanced in an amount sufficient to bring the next-in-line of the pockets 22 into alignment with the aperture 26, thereby dropping the catalyst package carried within that particular pocket into the conduit 27. This advance of the wheel is achieved by means of ratchet device (Fig. 3) which is mounted at the base of the shaft 24. This device consists of a ratchet wheel 31 fixedly mounted on the shaft 24, an arm 32 carrying a pawl 33 and having one end rotatably mounted about the shaft 24 while the other end is pivotally mounted to the core 34 of an electromagnet or solenoid 35. As the latter is energized, a collar 36 on the core 34 compresses spring 37, the arm 32 at the same time being shifted sufficiently to bring the pawl 33 into engagement with the next tooth of ratchet wheel 31. As the solenoid is then de-energized, the force exerted by the spring 37 causes the ratchet wheel 24, and with it wheel 23, to be rotated in an amount sufficient to bring the next pocket 22 into package-dropping position, the teeth on the ratchet wheel corresponding in number with the pockets 22.

In the simplest operation of the apparatus of the present invention, the catalyst packages 21, whether dropped from the pockets 22 or inserted manually into the conduit 27, first pass through valve 28 into the chamber 29. Valve 28 is then closed and valve 30 thereafter opened to permit the chamber 29 to be brought to the operating pressure of the system, whereupon the package will drop into the liquid contained in either the chamber 18, as provided in the structure of Fig. 1, or into the liquid of the reactor 10 itself, as in the case of the structure shown in Fig. 2. The result in either case is the same, for once the catalyst package reaches the liquid, the latter dissolves the wrapper of the package and thereby frees the catalyst to the liquid. The screen 19 employed in the structure of Fig. 1 serves to retain the package in the chamber 18 until the wrapper dissolves in order to prevent blocking of the line 20; however, this screen is not of such fineness as to prevent passage of the catalyst particles themselves, the latter being swept into the reactor 10 with the circulating fluid passing out of the chamber 18 and through the line 20.

In the preferred form of the invention, provision is made to introduce ethylene or an inert gas, as nitrogen or the like, under pressure into the chamber 29 through a line 36 (provided with valve 37) after the catalyst package has reached the chamber and the valve 28 has been closed. In this fashion, chamber 29 can be brought to substantially the same pressure as prevails within the reactor 10 or the chamber 18 before the gate valve 30 is opened to release the catalyst package to the reaction liquid. Again, with the closing of valve 30, the chamber 29 is preferably vented to the atmosphere through line 38 (provided with a valve 39) before the next catalyst package enters the chamber 29.

In a system of the type described above for the manufacture of ethyl chloride, the need for addition of fresh catalyst is evidenced by a rise in reactor pressure, and each time the pressure in the reactor rises above a predetermined level, a new catalyst package is released to the liquid reaction mixture. With the introduction of fresh catalyst, the pressure in the reactor drops below the point at which catalyst addition is initiated. In the form of apparatus illustrated in the drawings, provision is made for automatically impelling the catalyst reservoir wheel 23 so as to drop a new catalyst package and for operating the various valves 28, 30, 37 and 39 so as to release the package to the reactor fluid, whenever the pressure within the reaction chamber 10 rises to a predetermined level. Such automatic operation of the mechanism is effected by means of the electrically-controlled cyclic timer generally indicated at 40. The action of the timer, as regards any particular cycle of operation, is initiated as the attainment of the critical pressure within the reaction chamber is communicated to the timer, by any suitable instrument, through conductor line 41. As the first step in the cycle, the solenoid 35 is actuated through conductor line 42, thereby causing the wheel 23 to rotate sufficiently to permit a catalyst package to be dropped into the conduit 27. As the second step in the cycle (which step may occur simultaneously with step 1), gate valve 28 is opened by a motor 43 actuated by the switch member 44 connected to the timer through conductor line 45, gate valve 28 then being closed by the motor 43 once the catalyst package has fallen into the chamber 29. As the third step in the cycle, the solenoid 46 on pressure line 36 (through which ethylene or an inert gas is supplied under pressure) is opened when energized by the conductor line 47, thereby permitting the chamber 29 to be pressurized. As the next step in the cycle, the gate valve 30 is opened by the motor 48 controlled by switch 49, the switch being connected to the timer through conductor line 50. This allows the catalyst package to fall into the liquid reaction mixture. Thereafter the valve 30 is closed, and and the ethylene supply is shut off from the chamber 29 as solenoid 46 becomes disengaged. As the last step in the cycle, the valve 39 on purge line 38 is opened as solenoid 51 is energized by conductor line 52, thereby allowing the removal of gas from within the chamber 29, including any which may accumulate therein during the period of operation prior to the initiation of the next catalyst-addition cycle. Vent line 38 is then closed as a new cycle of operation is initiated by the pressure-responsive device connected to the timer through line 41.

The following example is illustrative of the present invention.

Example

This operation concerned itself with a process wherein ethyl chloride was produced by admitting a gaseous mixture of ethylene and hydrogen chloride (in the ratio of approximately 1.07 moles $C_2H_4$ per mole of HCl) under pressure of approximately 150 p. s. i. to a reaction chamber containing liquid ethyl chloride and ferric chloride catalyst, the incoming feed gases reacting with one another to form additional quantities of liquid ethyl chloride in the presence of the catalyst. The liquid within the reaction chamber was circulated through a cooler so as to maintain a reaction temperature of approximately 130° F. with an amount of the liquid sufficient to maintain a constant level in the reaction chamber being sent to a product recovery unit where the ethyl chloride was separated from the other components of the reaction mixture. At the period in the operation of the unit wherein the activity of the catalyst was high (as at the start-up of the unit or after the addition of fresh catalyst) the pressure prevailing in the reaction chamber was about 120 p. s. i., though this value gradually rose to approximately 150 p. s. i. as the catalyst diminished activity. In an effort to maintain a constant level of ethyl chloride production, fresh catalyst was introduced under pressure into the system in the form of a ferric chloride-liquid ethyl chloride slurry whenever it appeared that the pressure within the system was begining to rise. However, despite the most careful operation by experienced personnel, it was never possible to obtain an average pressure fluctuation of less than 20 p. s. i. with each injection of catalyst. Furthermore, because of the attendant irregularity in the rate of ethyl chloride production, the amount of product which could be sent to the product recovery unit without changing the liquid level in the reaction chamber varied within such wide limits as to give rise to difficulties in the operation of this unit.

When, however, the foregoing method of catalyst addition was abandoned in favor of one where in uniform quantities of ferric chloride catalyst were introduced in the form of packages wherein the catalyst was hermetically sealed within protective isobutylene-styrene copolymer envelopes, it was possible to reduce the pressure variation occurring in the reaction chamber with the addition of each catalyst package to a maximum of but 6 p. s. i. Not only was the whole operation of the system thereby greatly smoothed out, with the amount of ethyl chloride withdrawn for product recovery being maintained at a relatively constant rate without changing the liquid level in the reaction chamber, but also the overall catalyst requirement for the production of a given amount of ethyl chloride was reduced by approximately 75% as compared with the amount necessarily employed using the ethyl chloride-catalyst slurry injection technique described in the preceeding paragraph. In this improved manner of operating the unit, the catalyst packages were introduced into the liquid reaction mixture via a conduit-lock apparatus of the type illustrated in the drawings, with solution of the copolymer wrapper in the mixture occurring within a very short interval after the packages came into contact therewith.

While the invention has been described above as it particularly relates to the addition of a packaged ferric chloride catalyst to a liquid ethyl chloride-containing reaction mixture, the invention is also susceptible of use in a wide variety of other processes. Thus, Raney nickel and similar catalysts employed in hydrogenation processes, which catalysts are normally contained in a protective fluid medium to prevent their attack by oxygen, can be enclosed in a suitable plastic or other wrapper which, though soluble in the reaction solution, is nevertheless impervious to attack or penetration by any oxygen-containing gas. Again, the various alkylation catalysts such as aluminum chloride and antimony trichloride, which must be protected against attack by moisture, can also be added to reaction solutions in the form of protectively wrapped envelopes or packages. Again, while styrene-isobutylene copolymers have been described as being particularly useful wrapping materials in which to enclose ferric chloride or other catalysts, a wide variety of other plastics, including the various polyvinyl chloride and other vinyl halide resins, could be used. In each case the adaptability of a given wrapper for a particular application of the present invention may readily be determined from a consideration of the known properties of the various available plastic materials.

The invention claimed is:

1. In a method of reacting together hydrogen chloride and an olefin in a liquid medium containing a catalyst for the reaction which loses its activity on exposure before contact with the reaction mixture, the steps comprising continuously feeding the said two reactants into a liquid reaction mixture containing said catalyst under reaction conditions, continuously withdrawing from the reaction mixture reaction product in the liquid phase containing used catalyst, and intermittently adding fresh quantities of said catalyst in the form of packages containing granular catalyst particles enclosed within a non-adherent protective wrapper fabricated of a material which is soluble in the reaction mixture.

2. A method in accordance with claim 1 wherein the protective wrapper of the catalyst packages is made of a copolymer of styrene and isobutylene.

3. In a method wherein ethylene and hydrogen chloride are reacted in a reaction medium comprising liquid ethyl chloride and a hydrochlorination catalyst which loses activity on exposure before contact with the reaction mixture, the steps comprising continuously feeding ethylene and hydrogen chloride to said reaction mixture while continuously withdrawing liquid reacted mixture therefrom and intermittently adding fresh quantities of catalyst to the liquid reaction mixture in the form of a package wherein the catalyst is enclosed within a non-adherent protective wrapper made up of a material which is soluble in said reaction mixture.

4. In a method wherein ethylene and hydrogen chloride are reacted in a reaction medium comprising liquid ethyl chloride and a ferric chloride hydrochlorination catalyst which loses activity on exposure before contact with the reaction mixture, the steps comprising continuously feeding ethylene and hydrogen chloride to said reaction mixture while continuously withdrawing liquid reacted mixture therefrom and intermittently adding fresh quantities of ferric chloride catalyst to the liquid reaction mixture in the form of a package wherein the ferric chloride catalyst is enclosed within a non-adherent protective wrapper made up of a material which is soluble in said reaction mixture.

5. The method of claim 4 wherein the wrapper on the catalyst package is made up of a copolymer of styrene and isobutylene.

6. In a method of reacting ethylene and hydrogen chloride to produce ethyl chloride, the steps comprising continuously supplying a gaseous mixture of ethylene and hydrogen chloride under elevated pressure to a reaction chamber containing a liquid reaction mixture made up of ethyl chloride and ferric chloride catalyst and maintained under elevated conditions of pressure and temperature, while continuously withdrawing said reaction mixture from the reaction chamber, and intermittently supplying fresh quantities of said catalyst, in the form of a protectively wrapped package, to the reaction mixture in said chamber whenever the pressure within the reaction chamber rises to a predetermined level, said package being made up of catalyst enclosed within a non-adherent wrapper of material which is soluble in the reaction mixture.

7. The method of claim 6 wherein the wrapper of the catalyst package is made up of a copolymer of styrene and isobutylene.

References Cited in the file of this patent

UNITED STATES PATENTS

| | | |
|---|---|---|
| 1,637,972 | Suida | Aug. 2, 1927 |
| 1,935,627 | Falter | Nov. 21, 1933 |
| 2,097,750 | Arnold et al. | Nov. 2, 1937 |
| 2,265,837 | Harding | Dec. 9, 1941 |
| 2,347,916 | Larrabee | May 2, 1944 |
| 2,370,234 | Degnen et al. | Feb. 27, 1945 |
| 2,378,394 | Degnen et al. | June 19, 1945 |
| 2,412,550 | Bond et al. | Dec. 10, 1946 |
| 2,562,804 | Martin et al. | July 31, 1951 |

FOREIGN PATENTS

| | | |
|---|---|---|
| 583,471 | Great Britain | Dec. 19, 1946 |

OTHER REFERENCES

Thomas: "Anhydrous Aluminum Chloride in Organic Chemistry," page 867 (1941).